United States Patent
Kon et al.

(10) Patent No.: US 10,798,943 B2
(45) Date of Patent: *Oct. 13, 2020

(54) USE OF 6-ANILINO PURINE DERIVATIVES TO IMPROVE HEAT STRESS TOLERANCE OF RICE SEEDLINGS

(71) Applicant: SYNGENTA PARTICIPATIONS AG, Basel (CH)

(72) Inventors: Kee Fui Kon, Singapore (SG); Joerg Leipner, Stein (CH); Nicolas Schmitt, Basel (CH); Anbu Bharathi Thayumanavan, Hyderabad (IN)

(73) Assignee: SYNGENTA PARTICIPATIONS AG, Basel (CH)

( * ) Notice: Subject to any disclaimer, the term of this patent is extended or adjusted under 35 U.S.C. 154(b) by 117 days.

This patent is subject to a terminal disclaimer.

(21) Appl. No.: 16/309,876

(22) PCT Filed: Jun. 7, 2017

(86) PCT No.: PCT/EP2017/063825
§ 371 (c)(1),
(2) Date: Dec. 13, 2018

(87) PCT Pub. No.: WO2017/216005
PCT Pub. Date: Dec. 21, 2017

(65) Prior Publication Data
US 2019/0387741 A1 Dec. 26, 2019

(30) Foreign Application Priority Data

Jun. 14, 2016 (IN) .............................. 201611020323

(51) Int. Cl.
*A01N 43/90* (2006.01)

(52) U.S. Cl.
CPC ................................... *A01N 43/90* (2013.01)

(58) Field of Classification Search
None
See application file for complete search history.

(56) References Cited

FOREIGN PATENT DOCUMENTS

| WO | 2009003428 A2 | 1/2009 |
| WO | 2012031574 A1 | 3/2012 |
| WO | 2016095881 A1 | 6/2016 |

*Primary Examiner* — Alton N Pryor
(74) *Attorney, Agent, or Firm* — Baker & Hostetler LLP; Toni-Junell Herbert

(57) ABSTRACT

The present invention relates to methods for improving the tolerance of crop plants to abiotic stress. In particular, the invention relates to methods for improving the tolerance of rice seedlings to heat stress during transplanting.

13 Claims, No Drawings

USE OF 6-ANILINO PURINE DERIVATIVES TO IMPROVE HEAT STRESS TOLERANCE OF RICE SEEDLINGS

CROSS-REFERENCE TO RELATED APPLICATIONS

This application is a 371 National Stage application of International Application No. PCT/EP2017/063825, filed Jun. 7, 2017, which claims priority to Indian Application No. 201611020323 filed Jun. 14, 2016, the entire contents of which applications are hereby incorporated by reference.

The present invention relates to methods for improving the tolerance of crop plants to abiotic stress. In particular, the invention relates to methods for improving the tolerance of rice seedlings to heat stress during transplanting.

Certain substituted 6-anilinopuine derivatives are known in the art to inhibit cytokinin oxidase, and may therefore be useful in controlling the levels of cytokinin in plants. WO2009/003428 describes substituted 6-anilinopurine derivatives of formula (I)

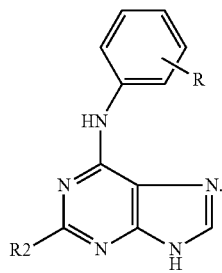

Rice is one of the most important human food crops in the world. Rice is particularly susceptible to heat stress; extremely high temperatures can lead to poor rice yields. Many of the world's main rice producing areas experience frequent heat stress events, in particular in Asia and western Africa. Rice seedlings are particularly susceptible to heat stress at the time of transplanting. Therefore there is a need for technology to improve the tolerance of rice seedlings to heat stress during transplanting in order to improve the transplant success rate.

According to the present invention, there is provided a method for improving the tolerance of rice seedlings to heat stress, comprising treating rice seedlings or the locus at which rice seedlings are growing, with a compound of formula (I)

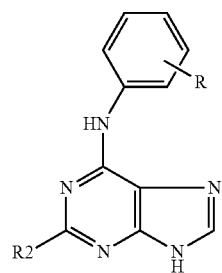

wherein R denotes one to five substituents independently selected from the group consisting of hydrogen, halogen, hydroxyl, amino, alkyloxy and alkyl; and R2 is selected from the group consisting of amino, halogen, nitro, thio, alkylthio and alkyl;
wherein heat stress is present or will be present within 10 days after treatment.

According to the present invention, there is provided a method for improving the tolerance of rice seedlings to heat stress, comprising (a) growing rice seedlings, (b) monitoring the air temperature at or near the locus at which the rice seedlings are growing, and (c) applying a compound of formula (I) to the rice seedlings or the locus at which the rice seedlings are growing, when heat stress is present or will be present within 10 days after treatment.

Although different varieties develop at different rates, and environmental factors strongly affect the duration of the different growth stages, the growth stages are well characterised, and defined on the rice "BBCH" (Biologische Bundesanstat, Bundessortenamt and Chemical industry) scale, a system for a uniform coding of phenologically similar growth stages of plants. The early BBCH growth stages for rice are shown in the table below.

| Growth stage | Code | Description |
|---|---|---|
| 0: Germination | 00 | Dry seed (caryopsis) |
| | 01 | Beginning of seed imbibition |
| | 03 | Seed imbibition complete (pigeon-breast) |
| | 05 | Radicle emerged from caryopsis |
| | 06 | Radicle elongated, root hairs and/or side roots visible |
| | 07 | Coleoptile emerged from caryopsis (in water-rice this stage occurs before stage 05) |
| | 09 | Imperfect leaf emerges (still rolled) at the tip of the coleoptile |
| 1: Leaf development | 10 | Imperfect leaf unrolled, tip of first true leaf visible |
| | 11 | First leaf unfolded |
| | 12 | 2 leaves unfolded |
| | 13 | 3 leaves unfolded |
| | 14 | 4 leaves unfolded |
| | 15 | 5 leaves unfolded |
| | 16 | 6 leaves unfolded |
| | 17 | 7 leaves unfolded |
| | 18 | 8 leaves unfolded |
| | 19 | 9 or more leaves unfolded |

In one embodiment, the rice seedlings are treated before transplantation. Transplanting typically takes place at growth stage BBCH 13.2.

In one aspect of the invention, treatment with the compound of formula (I) takes place from 1 to 10 days before transplanting. In one aspect of the invention, treatment with the compound of formula (I) takes place at least 1 day, at least 2 days, at least 3 days, at least 4 days, at least 5 days, at least 6 days, at least 7 days, at least 8 days, at least 9 days or at least 10 days before transplanting.

In one embodiment, the rice plants are at the seedling growth stage at the time of treatment.

In one embodiment, the rice seedlings are at a BBCH growth stage from 01 to 14 at the time of treatment.

In a further embodiment, the rice seedlings are at a growth stage from pigeon-breast to 3-leaf (from BBCH 03 to BBCH 13) at the time of treatment.

In one embodiment, the compound of formula (I) is applied to the rice seedlings at the pigeon-breast growth stage (BBCH 03).

In one embodiment, the compound of formula (I) is applied to the rice seedlings at the 2-leaf growth stage (BBCH 12).

In one embodiment, the compound of formula (I) is applied to the rice seedlings at the 3-leaf growth stage (BBCH 13).

"Heat stress" refers to temperature conditions that negatively affect plant metabolism and development, and can also limit plant growth or reduce yield potential. The temperature threshold varies by plant species and variety. Heat stress may occur during the daytime or night time.

Heat stress includes conditions in which the daily minimum (nighttime) temperature is at least 22° C., and/or the daily maximum (daytime) temperature is at least 32° C. In one embodiment, the daily minimum temperature is at least 22° C., at least 23° C., at least 24° C., at least 25° C., at least 26° C., at least 27° C., at least 28° C., at least 29 C, or at least 30° C. The daily minimum temperature may be measured over a given day, or over several consecutive days, for example 3, 4, 5, 6 or 7 days. In a further embodiment, the daily maximum temperature is at least 32° C., at least 33° C., at least 34° C., at least 35° C., at least 36° C., at least 37° C., at least 38° C., at least 39° C., or at least 40° C. The daily maximum temperature may be measured over a given day, or over several days, for example 2, 3, 4, 5, 6 or 7 days within a time span of 7 days.

In one embodiment, the minimum nighttime temperature is at least 22° C., and the maximum daytime temperature is at least 36° C.

Heat stress includes conditions in which the average daily minimum temperature is at least 25° C., and/or the average daily maximum temperature is at least 34° C. In one embodiment, the average daily minimum temperature is at least 25° C., at least 26° C., at least 27° C., at least 28° C., at least 29 C, or at least 30° C. The average daily minimum temperature may be measured over a given day, or over several consecutive days, for example 3, 4, 5, 6 or 7 days. In a further embodiment, the average daily maximum temperature is at least 34° C., at least 35° C., at least 36° C., at least 37° C., at least 38° C., at least 39° C., or at least 40° C. The average daily maximum temperature may be measured over a given day, or over several days, for example 2, 3, 4, 5, 6 or 7 days within a time span of 7 days.

The present invention is particularly useful when heat stress occurs both during the night and day, so that the rice plants are subjected to continuous heat stress with no recovery period. In one embodiment, the average daily minimum temperature is at least 22° C., and the average daily maximum temperature is at least 32° C. In one embodiment, the average daily minimum temperature is at least 24° C., and the average daily maximum temperature is at least 35° C. In one embodiment, the average daily minimum temperature is at least 25° C., and the average daily maximum temperature is at least 34° C.

In one embodiment, the average daily minimum temperature is at least 25° C., and the average daily maximum temperature is at least 37° C.

In a further embodiment, the average daily minimum temperature is at least 27° C., and the average daily maximum temperature is at least 37° C.

In a further embodiment, the average daily minimum temperature is at least 27° C., and the average daily maximum temperature is at least 39° C.

Heat stress can be influenced by other conditions than air temperature. For example heat stress may be more severe where there is high air moisture, high radiation and/or high wind speed.

In one aspect of the present invention, environmental conditions are monitored so that heat stress can be forecast several days or weeks in advance.

In one embodiment, treatment of rice seedlings is made within 5 days, 4, days, 3 days, 2 days, or 1 day after the onset of heat stress. In one embodiment, rice seedlings are treated when heat stress has been present for less than 5 days, less than 4 days, less than 3 days, less than 2 days or less than 1 day. In a further embodiment, treatment of rice seedlings according to the present invention is made before the onset of heat stress, for example at least 1 day, at least 2 days, at least 3 days, at least 4 days, at least 5 days, at least 6 days, at least 7 days, at least 8 days, at least 9 days or at least 10 days before heat stress conditions are present. Preferably treatment is made at least 1 day before the onset of heat stress, and heat stress occurs within 5 days after treatment.

The compound of formula (I) includes several variants. In one embodiment R is methoxy. In a further embodiment R2 is halogen. In a still further embodiment R is methoxy and R2 is halogen. In one aspect of the invention R2 is fluorine.

Preferably, the compound of formula (I) has the formula (1a):

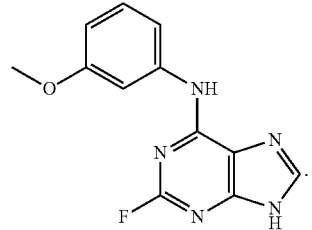

In one embodiment, the compound of formula (I) or (Ia) is applied in the form of a composition, which composition further comprises one or more formulation adjuvants.

The compound of formula (I) is applied at a field rate from 0.1 to 1000 g ai/ha. For example, the compound is applied at a field rate from 1 to 100 g ai/ha, from 5 to 50 g ai/ha, from 5 to 40 g ai/ha, from 5 to 30 g ai/ha, from 5 to 25 g ai/ha, from 5 to 20 g ai/ha, from 5 to 15 g ai/ha, from 5 to 10 g ai/ha. In one embodiment, the compound of formula (I) is applied at a field rate of 5 g ai/ha. In rice cultivation, plants are sown at a high density, typically in seedling boxes measuring 30 cm by 60 cm; one seedling box is used to plant 50 sqm of field. Therefore, the field rate of the compound of formula (I) is applied to 200 seedling boxes, which is the equivalent of 1 hectare.

In one embodiment, the compound of formula (I) is applied at a rate from 5 to 10 g ai/ha to rice seedlings at the 2-leaf growth stage.

In one embodiment, the compound of formula (I) is applied at a rate from 5 to 10 g ai per 200 seedling boxes to rice seedlings at the 2-leaf growth stage.

In a further embodiment, the compound of formula (I) is applied at a rate of about 5 g ai/ha to rice seedlings at the 2-leaf growth stage.

In a further embodiment, the compound of formula (I) is applied at a rate of about 5 g ai per 200 seedling boxes to rice seedlings at the 2-leaf growth stage.

In a further embodiment, the compound of formula (I) is applied at a rate of 5 g ai/ha to rice seedlings at the 2-leaf growth stage.

In a further embodiment, the compound of formula (I) is applied at a rate of 5 g ai per 200 seedling boxes to rice seedlings at the 2-leaf growth stage.

In one embodiment, the compound of formula (I) is applied to the seedlings more than once before or during the period of heat stress. For example, successive applications of the compound of formula (I) may be made at regular intervals, for example every 1, 2, 3, 4 or 5 days. Preferably at least the first application of the compound of formula (I) is made before the onset of heat stress.

In one embodiment, the method of the present invention does not result in any adverse effects to the rice seedlings, such as phytotoxicity.

The compound or composition of the present invention may be applied via any suitable method, including foliar spray, soil drench, soil irrigation, drip irrigation, and incorporation into soil. In one embodiment, the compound of formula (I) is applied via foliar spray.

The present invention may be used to improve tolerance to heat stress for any rice species and variety. Common cultivated rice species include *Oryza sativa* (Asian rice) and *Oryza glaberima* (African rice). There are many different rice varieties within each species; for example, major varieties of *Oryza sativa* include *indica, japonica, aromatic* and *glutinous*. Although heat stress may conditions vary between rice varieties, the rice growers are skilled in determining the specific conditions that constitute heat stress for a given rice variety. Common rice varieties include *Oryza sativa* variety ADT43, ADT45, NK5251, NK3325 and TN11.

Tolerance to heat stress during or after transplanting may be measured by counting the number of rice plants that do not exhibit yellowing, burned leaf tips, for example by making a visual assessment of damage or measuring NDVI (Normalized Difference Vegetation Index) using a remote sensing device such as Green Seeker™.

Tolerance to heat stress also may be monitored by measuring many different aspects of the rice plant, for example the number of empty spikelets, percentage ripening, thousand grain weight, grain yield, plant stand, photosynthetic activity, transpiration rate, or water use efficiency.

The following effects may be indicative of an improvement in tolerance to heat stress, for example a reduction in the number of empty spikelets, increase in percentage ripening, increase in thousand grain weight, increase in yield, increase in plant stand, increase in photosynthesis, or an increase in leaf transpiration. The present invention also leads to more uniform timing of ripening within a rice crop, which results in improved grain homogeneity and quality of the rice harvest. A more uniform timing of ripening is important because over-ripened rice grains are more easily damaged during milling, leading to lower quality of the harvest.

In one embodiment, there is provided the use of a compound of formula (I) as described herein to improve the tolerance of rice seedlings to heat stress. There is also provided the use of a compound of formula (I) as described herein to improve the tolerance of rice seedlings to heat stress during transplanting.

In one embodiment, the compound of formula (I) is applied in combination with at least one further active ingredient or product that improves tolerance to heat stress. The further active ingredient or product may act synergistically with the compound of formula (I) such that the rates of application of each component is lowered, and/or the heat stress tolerance is improved.

A synergistic effect exists whenever the action of an active ingredient combination is greater than the sum of the actions of the individual components. The action to be expected E for a given active ingredient combination obeys the so-called COLBY formula and can be calculated as follows (COLBY, S. R. "Calculating synergistic and antagonistic responses of herbicide combination". Weeds, Vol. 15, pages 20-22):

ppm=milligrams of active ingredient (a.i.) per liter
X=% action by first active ingredient using p ppm of the active ingredient
Y=% action by second active ingredient using q ppm of the active ingredient.

According to Colby, the expected (additive) action of active ingredients A+B using p+q ppm of active ingredient is $$E = X + Y - \frac{X \cdot Y}{100}$$

If the action actually observed O is greater than the expected action E, then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

The further active ingredient may be any active ingredient that enhances tolerance to heat stress. In particular, there may be mentioned a strobilurin fungicide, for example selected from the group consisting of azoxystrobin, pyraclostrobin, trifloxystrobin, and fluoxastrobin. In one embodiment, the further active ingredient is azoxystrobin or pyraclostrobin. In particular, the further active ingredient is azoxystrobin.

The further product may be any product that enhances tolerance to heat stress. In particular there may be mentioned biostimulant products that contain one or more micronutrients, macronutrients, plant hormones, or amino acids. Examples of biostimulant products include seaweed extracts, Quantis™, Isabion™, Vitazyme™, Megafol™, Releaseed™, Biozyme™, TerraSorb™, Aminocore™, Radical™, Proplex™, Bio-forge™, Terrabiogen™, Folicist™, Cytozyme™, Cytoplant™, and Greenstim™.

In one embodiment, the further active ingredient is selected from the group consisting of azoxystrobin, Quantis™ and Isabion™.

The further active ingredient or product that enhances tolerance to heat stress may be applied at the same time as the compound of formula (I) or sequentially before or after application of formula (I). In one aspect, the further active ingredient is applied as a tank mix partner with the compound of formula (I).

In one embodiment of the invention, the method for improving the tolerance of rice plants to heat stress further includes the step of applying azoxystrobin.

In one aspect of the invention, there is provided a mixture, composition, or spray solution comprising a compound of formula (Ia) and azoxystrobin.

The term "seedling" refers to a young plant grown from a seed or a tiller that has been split from a main plant, that can be transplanted with the potential to develop into a mature plant.

The term "plants" refers to all physical parts of a plant, including seeds, seedlings, saplings, roots, tubers, stems, stalks, foliage, and fruits.

The term "locus" as used herein means fields in or on which plants are growing, or where seeds of cultivated plants are sown, or where seed will be placed into the soil. It includes soil, seeds, and seedlings, as well as established vegetation.

Where a range of numbers is disclosed herein (for example, 1 to 10), this is intended to include all numbers and intervening values within that range (for example, 1, 1.1, 2, 3, 3.9, 4, 5, 6, 6.5, 7, 8, 9 and 10) and also any sub-range of numbers and intervening values within that range (for example, 2 to 8, 1.5 to 5.5 and 3.1 to 4.7). Additionally, it is intended that the both the upper and lower limits specified are included within the range.

Where ranges or values used herein are preceded by the term "about", this term is intended to provide support for both the exact number that it precedes, and also a number that is near to or approximately the number that it precedes. In determining whether a number is near to or approximately a specifically recited number, the near or approximating number may be a number, which would be rounded to or be substantially equivalent to the specifically recited number. For example, the term "about 5" includes 5.0, 4.5, 5.4, 4.92, 5.01, and so on.

The compound of formula (I) may be applied in the form of a composition. The composition can be in the form of concentrates which are diluted prior to use, although ready-to-use compositions can also be made. The final dilution is usually made with water, but can be made instead of, or in addition to, water, with, for example, liquid fertilisers, micronutrients, biological organisms, oil or solvents.

The compositions according to the invention are generally formulated in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, micro-emulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydro-furfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecyl-benzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono and di-alkylphosphate esters; and also further substances described e.g. in McCutcheon's Detergents and Emulsifiers Annual, MC Publishing Corp., Ridgewood N.J. (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micro-nutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of C8 C22 fatty acids, especially the methyl derivatives of C12-C18 fatty acids, for example the methyl esters of lauric acid, palmitic acid and oleic acid (methyl laurate, methyl palmitate and methyl oleate, respectively). Many oil derivatives are known from the Compendium of Herbicide Adjuvants, 10th Edition, Southern Illinois University, 2010.

The inventive compositions generally comprise from 0.1 to 99% by weight, especially from 0.1 to 95% by weight, of compounds of the present invention and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Preferred formulations can have the following compositions (weight %):
Emulsifiable Concentrates:
active ingredient: 1 to 95%, preferably 60 to 90%
surface-active agent: 1 to 30%, preferably 5 to 20%
liquid carrier: 1 to 80%, preferably 1 to 35%
Dusts:
active ingredient: 0.1 to 10%, preferably 0.1 to 5%
solid carrier 99.9 to 90%, preferably 99.9 to 99%
Suspension Concentrates:
active ingredient: 5 to 75%, preferably 10 to 50%
water: 94 to 24%, preferably 88 to 30%
surface-active agent: 1 to 40%, preferably 2 to 30%
Wettable Powders:
active ingredient: 0.5 to 90%, preferably 1 to 80%
surface-active agent: 0.5 to 20%, preferably 1 to 15%
solid carrier: 5 to 95%, preferably 15 to 90%
Granules:
active ingredient: 0.1 to 30%, preferably 0.1 to 15%
solid carrier: 99.5 to 70%, preferably 97 to 85%

The following Examples further illustrate, but do not limit, the invention.

| Wettable powders | a) | b) | c) |
|---|---|---|---|
| active ingredients | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
|---|---|---|---|
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | — | 20 |

The combination is thoroughly mixed with the adjuvants and the mixture is thoroughly ground in a suitable mill, affording powders that can be used directly for seed treatment.

| Emulsifiable concentrate | |
|---|---|
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
|---|---|---|---|
| Active ingredients | 5% | 6% | 4% |
| Talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruder granules | |
|---|---|
| Active ingredients | 15% |
| sodium lignosulfonate | 2% |
| carboxymethylcellulose | 1% |
| Kaolin | 82% |

The combination is mixed and ground with the adjuvants, and the mixture is moistened with water. The mixture is extruded and then dried in a stream of air.

| Coated granules | |
|---|---|
| Active ingredients | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

Suspension Concentrate

| active ingredients | 40% |
|---|---|
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Flowable Concentrate for Seed Treatment

| active ingredients | 40% |
|---|---|
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

The composition of the present invention may be applied to a plant, part of the plant, plant organ, plant propagation material or a plant growing locus.

The application is generally made by spraying the composition, typically by tractor mounted sprayer for large areas, but other methods such as dusting (for powders), drip or drench can also be used. Alternatively the composition may be applied in furrow or directly to a seed before or at the time of planting.

The composition of the present invention may be applied pre-emergence or post-emergence. Where the composition is used to regulate the growth of crop plants or enhance the tolerance to abiotic stress, it may be applied post-emergence of the crop. Where the composition is used to inhibit or delay the germination of seeds, it may be applied pre-emergence. Where the composition is used to control pests, it may be applied as a preventative (before pest establishment) or curative (after pest establishment) treatment.

The present invention envisages application of the compositions of the invention to plant propagation material prior to, during, or after planting, or any combination of these. Although active ingredients can be applied to plant propagation material in any physiological state, a common approach is to use seeds in a sufficiently durable state to incur no damage during the treatment process. Typically, seed would have been harvested from the field; removed from the plant; and separated from any cob, stalk, outer husk, and surrounding pulp or other non-seed plant material. Seed would preferably also be biologically stable to the extent that treatment would not cause biological damage to the seed. It is believed that treatment can be applied to seed at any time between seed harvest and sowing of seed including during the sowing process.

Methods for applying or treating active ingredients on to plant propagation material or to the locus of planting are known in the art and include dressing, coating, pelleting and soaking as well as nursery tray application, in furrow application, soil drenching, soil injection, drip irrigation, application through sprinklers or central pivot, or incorporation into soil (broad cast or in band). Alternatively or in addition active ingredients may be applied on a suitable substrate sown together with the plant propagation material.

The rates of application of compositions of the present invention may vary within wide limits and depend on the nature of the soil, the method of application (pre- or post-emergence; seed dressing; application to the seed furrow; no tillage application etc.), the crop plant, the prevailing climatic conditions, and other factors governed by the method of application, the time of application and the target crop. For foliar or drench application, the compositions of the present invention are generally applied at a rate of from 1 to 2000 g/ha, especially from 5 to 1000 g/ha. For seed treatment the rate of application is generally between 0.0005 and 150 g per 100 kg of seed.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides like bromoxynil or classes of herbicides such as ALS-, EPSPS-, GS-, HPPD- and PPO-inhibitors.

Crops are also to be understood as being those which naturally are or have been rendered resistant to harmful insects. This includes plants transformed by the use of recombinant DNA techniques, for example, to be capable of synthesising one or more selectively acting toxins, such as are known, for example, from toxin-producing bacteria.

Examples of toxins which can be expressed include d-endotoxins, vegetative insecticidal proteins (Vip), insecticidal proteins of bacteria colonising nematodes, and toxins produced by scorpions, arachnids, wasps and fungi.

Normally, in the management of a crop a grower would use one or more other agronomic chemicals or biologicals in addition to the composition of the present invention.

EXAMPLES

Example 1

Trials were setup in two locations in India to test the effect of compounds of formula I on tolerance of rice seedlings to heat stress during transplantation.

For each trial, hybrid rice variety ADT45 was sown in seedling boxes. A compound of formula (Ia) was applied by foliar spray in the form of an EC formulation, at various dose rates and seedling growth stages as shown in Table 1.

TABLE 1

List of treatments

| Treatment | Active ingredient | Rate (g ai/ha) | Application timing |
|---|---|---|---|
| 1 | Untreated control | n/a | n/a |
| 2 | Formula Ia | 5 | Pigeon-breast |
| 3 | Formula Ia | 10 | Pigeon-breast |
| 4 | Formula Ia | 20 | Pigeon-breast |
| 5 | Formula Ia | 5 | 2-leaf |
| 6 | Formula Ia | 10 | 2-leaf |
| 7 | Formula Ia | 20 | 2-leaf |
| 8 | Formula Ia | 5 | 3-leaf |
| 9 | Formula Ia | 10 | 3-leaf |
| 10 | Formula Ia | 20 | 3-leaf |

Transplanting took place at the 13.2 leaf growth stage. Transplant shock was used as an indicator of tolerance to heat stress, and was measured via visual assessment of damage severity on a scale of 0% (no damage) to 100% (dead plant); observations such as yellowing and leaf tip burning are indicators of damage. Transplant shock was also assessed by measuring NVDI values using a Green Seeker™ crop sensor, which measures the percentage green area. A low transplant shock stress rating and high NVDI rating indicate improved tolerance to transplant shock stress.

Other parameters (uniformity of foliage growth, uniformity of greening, greenness, whiteness of root mat, seedling height, time to 13.2 leaf stage, and percentage seedling injury) were also measured to check for any phytotoxic effects on the seedlings.

Trial 1: Kumbakonam, India

The trial was carried out between 7 May 2015 and 15 Jun. 2015, with transplanting on 29 May 2015. The mean maximum daily temperature during the trial period was 37.3° C., and mean minimum daily temperature during the trial period was 24.9° C. The mean temperature during the entire trial period was 31.1° C. The results are shown in Tables 2 and 3.

TABLE 2

Transplant shock stress at Kumbakonam trial

| Treatment | Transplanting shock stress ($4^{th}$ day) | Transplanting shock stress ($8^{th}$ day | Transplanting shock stress ($12^{th}$ day) | NVDI data (10 DAT) | NVDI data (15 DAT) |
|---|---|---|---|---|---|
| 1 | 32 | 32 | 15 | 9 | 20 |
| 2 | 32 | 35 | 15 | 12 | 19 |
| 3 | 38 | 32 | 17 | 6 | 19 |
| 4 | 30 | 22 | 13 | 10 | 20 |
| 5 | 15 | 13 | 7 | 13 | 22 |
| 6 | 30 | 22 | 10 | 12 | 20 |
| 7 | 35 | 37 | 22 | 11 | 19 |
| 8 | 27 | 32 | 17 | 10 | 19 |
| 9 | 42 | 27 | 15 | 15 | 18 |
| 10 | 45 | 37 | 25 | 15 | 20 |

The results show that treatment with the compound of formula (Ia) improved tolerance to heat stress and/or reduced transplant shock stress, with treatments 5 and 6 (2-leaf growth stage, 5-10 g ai/ha) giving the best results.

TABLE 3

Phytotoxicity assessments at Kumbakonam trial

| Treatment | Uniformity of foliage growth at 3.2 leaf (%) | Uniformity of greening at 3.2 leaf (%) | Greenness at 3.2 leaf (unit) | Whiteness of root mat at 3.2 leaf (%) | Seedling height at 3.2 leaf (cm) | Time to 3.2 leaf (day) | Seedling injury (%) |
|---|---|---|---|---|---|---|---|
| 1 | 90 | 95 | 3 | 90 | 14 | 13 | 0 |
| 2 | 90 | 95 | 3 | 90 | 14 | 14 | 0 |
| 3 | 90 | 95 | 3 | 90 | 13 | 14 | 0 |
| 4 | 90 | 95 | 3 | 90 | 13 | 14 | 0 |
| 5 | 95 | 95 | 3 | 85 | 14 | 13 | 0 |
| 6 | 90 | 90 | 2.8 | 85 | 14 | 13 | 3 |
| 7 | 90 | 85 | 2.5 | 85 | 14 | 13 | 8 |
| 8 | 90 | 95 | 3 | 90 | 14 | 13 | 0 |
| 9 | 90 | 95 | 3 | 90 | 14 | 13 | 0 |
| 10 | 90 | 85 | 2.5 | 85 | 14 | 13 | 15 |

Although some marginal effects were observed at the highest dose rate, the results show that treatment with the compound of formula (Ia) did not cause any phytotoxic effects to the rice seedlings.

Trial 2: Ramapuram, India

The trial was carried out between 5 Aug. 2015 and 9 Sep. 2015, with transplanting on 15 Aug. 2015. The mean maximum daily temperature during the trial period was 35.3° C., and mean minimum daily temperature during the trial period was 23.7° C. The mean temperature during the entire trial period was 30.2° C. The results are shown in Tables 4 and 5.

TABLE 4

Transplant shock stress at Ramapuram trial

| Treatment | Transplanting shock stress (4th day) | Transplanting shock stress (8th day) | Transplanting shock stress (12th day) | Green seeker data (15 DAT morning) | Green seeker data (15 DAT afternoon) | Green seeker data (15 DAT evening) |
| --- | --- | --- | --- | --- | --- | --- |
| 1 | 4 | 15 | 18 | 22 | 27 | 28 |
| 2 | 4 | 12 | 13 | 22 | 28 | 31 |
| 3 | 3 | 7 | 17 | 25 | 25 | 29 |
| 4 | 4 | 8 | 20 | 21 | 28 | 25 |
| 5 | 0 | 2 | 4 | 25 | 27 | 34 |
| 6 | 0 | 1 | 7 | 28 | 29 | 32 |
| 7 | 9 | 8 | 11 | 22 | 26 | 26 |
| 8 | 7 | 12 | 13 | 23 | 26 | 30 |
| 9 | 13 | 20 | 31 | 23 | 26 | 31 |
| 10 | 23 | 37 | 34 | 25 | 30 | 29 |

The results show that treatment with the compound of formula (Ia) improved tolerance to heat stress and/or reduced transplant shock stress, with treatments 5 and 6 (2-leaf growth stage, 5-10 g ai/ha) giving the best results.

TABLE 5

Phytotoxicity assessments at Ramapuram trial

| Treatment | Uniformity of foliage growth at 3.2 leaf (%) | Uniformity of greening at 3.2 leaf (%) | Greenness at 3.2 leaf (unit) | Whiteness of root mat at 3.2 leaf (%) | Seedling height at 3.2 leaf (cm) | Time to 3.2 leaf (day) | Seedling injury (%) |
| --- | --- | --- | --- | --- | --- | --- | --- |
| 1 | 90 | 95 | 3 | 90 | 14 | 13 | 0 |
| 2 | 90 | 95 | 3 | 90 | 13 | 14 | 0 |
| 3 | 90 | 95 | 3 | 90 | 13 | 14 | 0 |
| 4 | 90 | 95 | 3 | 90 | 13 | 14 | 0 |
| 5 | 90 | 95 | 3 | 85 | 15 | 13 | 0 |
| 6 | 90 | 95 | 3 | 85 | 15 | 13 | 2 |
| 7 | 90 | 85 | 2.5 | 80 | 15 | 13 | 5 |
| 8 | 90 | 95 | 3 | 90 | 14 | 13 | 0 |
| 9 | 90 | 95 | 3 | 90 | 15 | 13 | 0 |
| 10 | 90 | 95 | 3 | 90 | 15 | 13 | 0 |

Although some marginal effects were observed at the highest dose rate, the results show that treatment with the compound of formula (Ia) did not cause any phytotoxic effects to the rice seedlings.

Trial 3

A trial was setup in 2016 as described above, with a different treatment list as shown in Table 6. The results are shown in Table 7.

TABLE 6

List of treatments for 2016 trial

| Treatment | Active ingredient | Rate (g ai/ha) | Application timing |
| --- | --- | --- | --- |
| 1 | Untreated control | n/a | n/a |
| 2 | Formula Ia | 5 | Sowing* |
| 3 | Formula Ia | 10 | (Sowing* |
| 4 | Formula Ia | 5 | 2-leaf |
| 5 | Formula Ia | 10 | 2-leaf |

TABLE 6-continued

List of treatments for 2016 trial

| Treatment | Active ingredient | Rate (g ai/ha) | Application timing |
|---|---|---|---|
| 6 | Formula Ia | 5 | 3-leaf |
| 7 | Formula Ia | 10 | 3-leaf |

*'Sowing' takes place after pre-imbibition, slightly later than 'pigeon breast' application timing.

TABLE 7

Results from 2016 trial
The mean daily minimum temperature from transplanting was 25.27° C. (22.20° C. to 27.70° C.) and the mean daily maximum temperature from transplanting was 36.15° C. (35.30° C. to 37.20° C.) during the 14 days after application.

| Treatment | Yield at 14% MC (kg/ha) | Average yield increase compared to UTC (%) |
|---|---|---|
| 1 | 6607 | na |
| 2 | 6799 | +2.9% |
| 3 | 6603 | −0.1% |
| 4 | 7014 | +6.2% |
| 5 | 7189 | +8.8% |
| 6 | 6978 | +5.6% |
| 7 | 6830 | +3.3% |

The invention claimed is:

1. A method for improving the tolerance of rice seedlings to heat stress, comprising treating rice seedlings or the locus at which rice plants are growing, with a compound of formula (I)

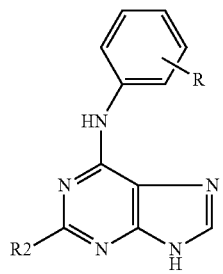

wherein R denotes one to five substituents independently selected from the group consisting of hydrogen, halogen, hydroxyl, amino, alkyloxy and alkyl; and
R2 is selected from the group consisting of amino, halogen, nitro, thio, alkylthio and alkyl;
wherein heat stress is present or will be present within 10 days after treatment, and wherein the tolerance of the treated rice seedlings is improved relative to untreated rice seedlings.

2. A method according to claim 1, wherein the rice seedlings are treated before transplanting.

3. A method according to claim 1, wherein the rice seedlings treated at a growth stage from pigeon-breast to 3-leaf.

4. A method according to claim 1, wherein the rice seedlings are treated at the 2-leaf growth stage.

5. A method according to claim 1 wherein the heat stress is a minimum daily temperature of at least 22° C., and a maximum daily temperature of at least 32° C.

6. A method according to claim 1 wherein the heat stress stress is an average daily minimum temperature of at least 25° C., and an average daily maximum temperature of at least 34° C.

7. A method according to claim 1, wherein the compound of formula (I) has the formula (1a):

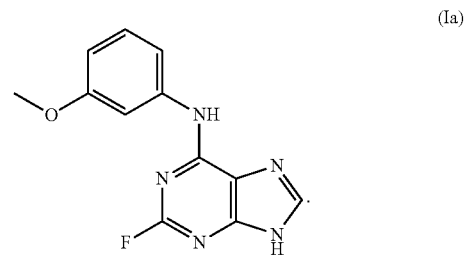

8. A method according to claim 1, wherein the compound of formula (I) is applied at a rate from 1 to 100 g ai/ha.

9. A method according to claim 1, wherein the compound of formula (I) is applied at a rate from 5 to 20 g ai/ha.

10. A method according to claim 7, wherein the compound is applied to rice plants at the 2-leaf growth stage at a rate from 5 to 10 g ai/ha.

11. A method according to claim 1, wherein the compound of formula (I) is applied simultaneously, or in successive applications with a further compound or product that improves tolerance to heat stress.

12. A method for improving the tolerance of rice seedlings to heat stress during transplanting, comprising (a) growing rice seedlings, (b) monitoring the air temperature at or near the locus at which the rice seedlings are growing, and (c) applying a compound of formula (I) to the rice seedlings or the locus at which the rice seedlings are growing, when heat stress is present or will be present within 10 days after treatment, wherein the compound of formula I has the following structure:

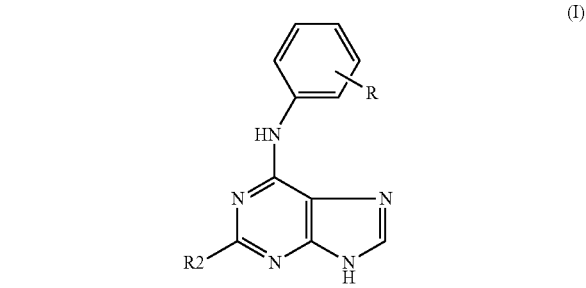

wherein R denotes one to five substituents independently selected from the group consisting of hydrogen, halogen, hydroxyl, amino, alkyloxy and alkyl;
wherein R2 is selected from the group consisting of amino, halogen, nitro, thio, alkylthio and alkyl; and
wherein the tolerance of the treated rice seedlings is improved relative to untreated rice seedlings.

13. The method according to claim 12, wherein the compound of formula (I) has the formula (1a):
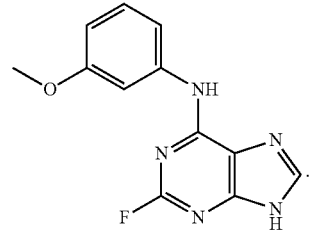
* * * * *